US008781956B2

(12) United States Patent
Crooks

(10) Patent No.: US 8,781,956 B2
(45) Date of Patent: Jul. 15, 2014

(54) SYSTEMS AND METHODS FOR MAKING STRUCTURED REFERENCE CREDIT DECISIONS

(71) Applicant: Global Analytics, Inc., San Diego, CA (US)

(72) Inventor: Theodore James Crooks, La Mesa, CA (US)

(73) Assignee: Global Analytics Holdings, Inc., San Diego, CA (US)

( * ) Notice: Subject to any disclaimer, the term of this patent is extended or adjusted under 35 U.S.C. 154(b) by 0 days.

(21) Appl. No.: 13/893,169

(22) Filed: May 13, 2013

(65) Prior Publication Data

US 2013/0246254 A1    Sep. 19, 2013

Related U.S. Application Data

(63) Continuation of application No. 12/167,962, filed on Jul. 3, 2008, now Pat. No. 8,452,699.

(60) Provisional application No. 60/947,973, filed on Jul. 4, 2007.

(51) Int. Cl.
*G06Q 40/00* (2012.01)
*G06Q 40/02* (2012.01)

(52) U.S. Cl.
CPC .................................... *G06Q 40/02* (2013.01)
USPC ........................................... 705/38; 705/39

(58) Field of Classification Search
CPC ................................................... G06Q 40/02
USPC ................................................ 705/38, 39, 80
See application file for complete search history.

(56) References Cited

U.S. PATENT DOCUMENTS

| 5,262,941 | A | 11/1993 | Saladin et al. | |
|---|---|---|---|---|
| 6,119,103 | A | 9/2000 | Basch et al. | |
| 6,587,841 | B1 | 7/2003 | DeFrancesco et al. | |
| 7,310,617 | B1 * | 12/2007 | Cunningham | 705/38 |
| 8,131,590 | B1 | 3/2012 | Armstrong | |
| 2003/0009418 | A1 * | 1/2003 | Green et al. | 705/38 |
| 2004/0030649 | A1 | 2/2004 | Nelson et al. | |
| 2005/0182713 | A1 * | 8/2005 | Marchesi | 705/39 |
| 2006/0089894 | A1 | 4/2006 | Balk et al. | |
| 2009/0024517 | A1 | 1/2009 | Crooks | |
| 2009/0070255 | A1 | 3/2009 | Muktevi | |
| 2009/0076972 | A1 * | 3/2009 | Witchel et al. | 705/80 |

OTHER PUBLICATIONS

International Search Report for International No. PCT/US08/69242 mailed Sep. 12, 2008 (3 pages).

(Continued)

*Primary Examiner* — Samica L Norman
(74) *Attorney, Agent, or Firm* — DLA Piper LLP (US)

(57) ABSTRACT

A structured reference credit decision device includes a database configured to store information related to applicants, potential customers, referencers, potential referencers, lenders, and other third parties, a fetch data component coupled with the database, the fetch data component configured to receive input application information, fetch relevant information from the database, based on the application information, related to a subject applicant of the input application information and at least one referencer, and generate a plurality of linked data packages based on the fetched information, and an evaluation device coupled with the fetch data component, the evaluation engine configure to apply credit outcome models to the plurality of linked data packages and generate a recommendation relative to the subject applicant or application.

25 Claims, 12 Drawing Sheets

(56) References Cited

OTHER PUBLICATIONS

Written Opinion for International No. PCT/US08/69242 mailed Sep. 12, 2008 (6 pages).
Anthony. Cooperation in Microcredit Borrowing Groups: Identity, Sanctions and Reciprocity in the Production of Collective Goods. American Sociological Review, vol. 70. 2005. [retrieved on Feb. 25, 2012]. Retrieved from the internet: URL<http://www.dartmouth.edu/~socy/pdfs/da_coopinmicrocredit_07.pdf> entire document (20 pages).

* cited by examiner

SYSTEMS AND METHODS FOR MAKING STRUCTURED REFERENCE CREDIT DECISIONS

RELATED APPLICATIONS/PRIORITY CLAIM

This application is a continuation of and claims priority under 35 USC 120 to U.S. patent application Ser. No. 12/167,962, filed Jul. 3, 2008, entitled "Systems and Methods for Making Structured Reference Credit Decisions" (to be issued as U.S. Pat. No. 8,452,699 to May 28, 2013), which in turn claims the benefit under 35 U.S.C. 119(e) of U.S. Provisional Patent Application Ser. No. 60/947,973, filed Jul. 4, 2007 and entitled "Process and Device for Extension of Credit Based Upon Credit Risk Assessments Using Credit Histories Linked by Structured References," both of which are incorporated herein by reference as if set forth in full.

BACKGROUND

1. Technical Field

The embodiments described herein relate to processes for making credit decisions and more particularly to processes for accurately evaluating the creditworthiness of a consumer, organization, family or business applying for a loan or a financial service account when conventional credit history information about the applicant is limited or entirely absent.

2. Related Art

There is great demand for the widespread availability of prudently granted financial credit for individuals, businesses, and other organizations. There is also strong evidence that wide availability of prudently managed credit promotes more efficient capital allocations resulting in improved economic growth and an overall improved human condition.

Credit history information is essential to prudent and efficient lending on any socially significant scale. Such information includes reliable data on the economic condition of prospective borrowers and past behavior of prospective borrowers with respect to borrowing and repayment behavior. In many lending environments, substantial information about credit obligations undertaken, failures to make agreed upon repayments, successful repayment, and defaults (known as "full credit data") is widely collected and readily available in credit bureaus or within lender or government records. In other lending or potential lending environments, only information on poor or defaulting payment records is available and in yet other environments only little or unreliable information is available, or information is available on only a limited proportion of prospective borrowers. Wherever available credit data is less than full credit data, opportunities to optimize the use of capital are mitigated and there is opportunity to improve.

The availability of credit data is also often limited for specific subpopulations within highly developed economies where full credit data is otherwise widely available. Some nations have limited credit data in general because of strict privacy laws; others because of an immature lending system or disruptions to banking, legal or credit systems. The need for improved credit data and better use of the data available is widespread. It is critical, for example, in poorer countries and those with delayed economic development.

FIG. 8A is a diagram illustrating a conventional decision device 800 that is configured to carry out a conventional credit application review and recommendation process. As can be seen, decision device 800 can comprise a fetch data component 804 configured to access required information from database 806. Database 806 can be configured to store information related to a credit applicant, such as name, address, birthdates, social security number, etc., as well as credit information such as credit bureau scores, etc.

When a new application 802 is received, or more specifically when information related to a new application 802 is input into device 800, then this can cause fetch data component 804 to fetch the relevant data from the database 806 and to generate a credit data package 808, which can be evaluated using various analytics by evaluation device 810. Once the data in the data package 810 has been evaluated, policy rules can be applied by policy rules engine 812 and a decision 814 can be generated.

But as noted, in environments where information about an applicant, especially their credit history, is scares or non-existent, such a conventional device 800 can be of little or even no use in making decisions related to applications 802.

SUMMARY

A structured credit system and method is described herein that can make use of reference information in order to make credit recommendations even when credit history information is missing or incomplete.

According to one aspect, a structured reference credit decision device includes a database configured to store information related to applicants, potential customers, referencers, potential referencers, lenders, and other third parties, a fetch data component coupled with the database, the fetch data component configured to receive input application information, fetch relevant information from the database, based on the application information, related to a subject applicant of the input application information and at least one referencer, and generate a plurality of linked data packages based on the fetched information, and a evaluation device coupled with the fetch data component, the evaluation engine configured to apply credit outcome models to the plurality of linked data packages and generate a recommendation relative to the subject applicant or application.

According to another aspect, a method for structured reference credit decisions includes storing information related to applicants, potential customers, referencers, potential referencers, lenders, and other third parties, receiving input application information, fetching relevant information from the database, based on the application information, related to a subject applicant of the input application information and at least one referencer, generating a plurality of linked data packages based on the fetched information, applying credit outcome models to the plurality of linked data packages, and generating a recommendation relative to the subject applicant or application.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
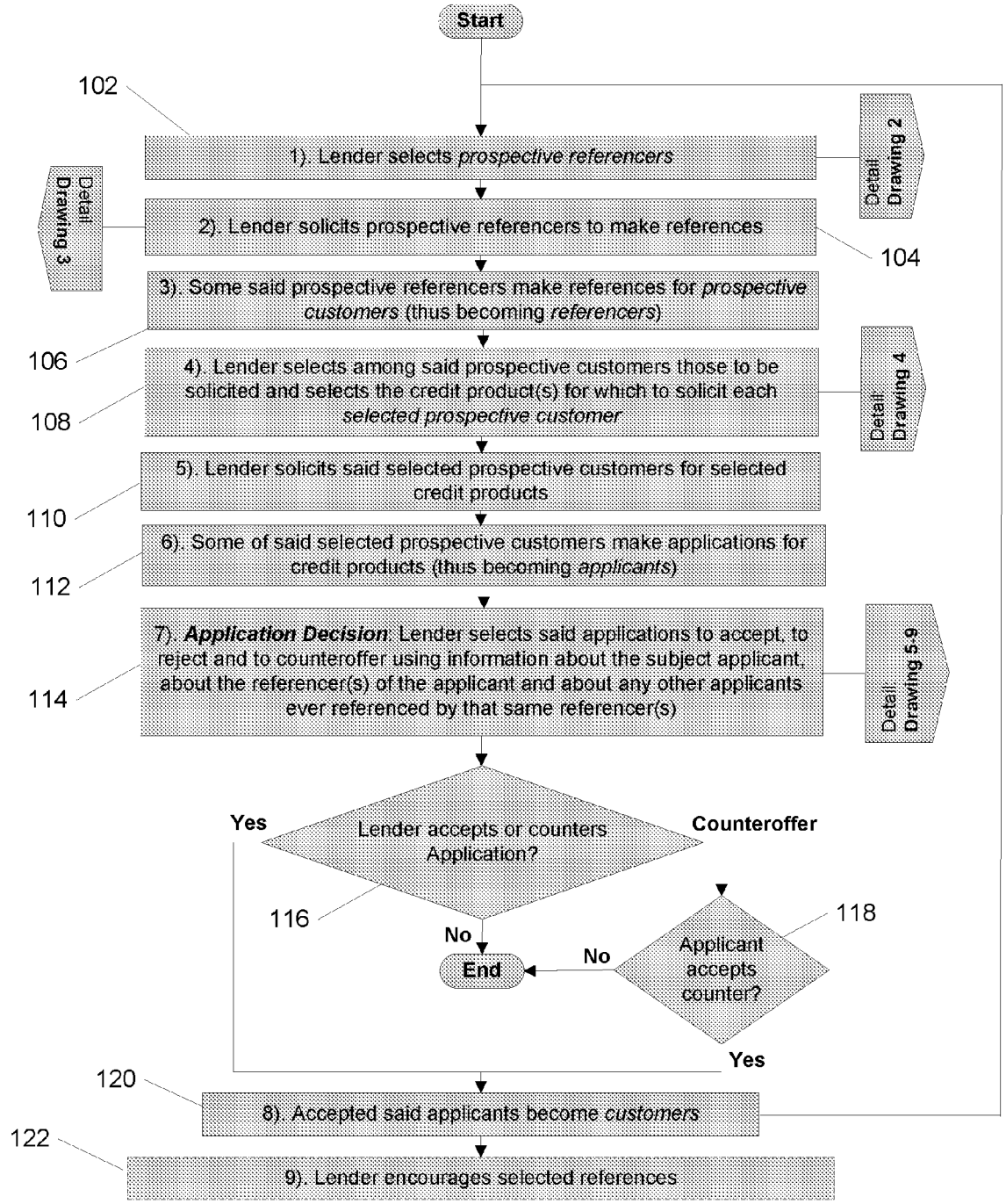
FIG. 1 is a flow chart illustrating an example structured reference credit process in accordance with one embodiment.

The embodiments described herein relate to the structured and controlled generation of references by individuals or groups to link credit history information from those with significant and known histories, to those with limited or no credit history. In this way, the most widespread barrier to expanded credit worldwide can be overcome in most situations. Further, the embodiments described herein can compound and extend conventional credit assessment tools and methods to form a new type of credit evaluation system and process that take advantage of the linked credit histories generated by the processes described.

The embodiments described herein can benefit both lenders and borrowers by offering a greater range of prudent lending options. The embodiments described herein can further benefit a host economy at large by making available additional options for uses of capital and more accurately predicting the true yield of those uses, thus fostering a more efficient market for many types of credit. The benefits provided are not only in the reduction or prediction of failures to meet obligations in a timely way, but in the ability to predict success in meeting obligations and accurately determining risk as a basis for more competitive pricing of credit with less need for provisions for uncertainty about expected losses. The embodiments described herein do not necessarily eliminate uncertainty, but in many situations they will substantially reduce uncertainty and, just as importantly, provide a better basis for quantifying the risk and expected cost of uncertainty.

The embodiments described herein can be of great importance to those in poor countries and poor or disadvantaged communities, or in any country in need of the greater economic growth more efficient allocation of capital can provide.

As described below, the embodiments described herein can rely on references of creditworthiness made by individuals, businesses, or other organizations about prospective borrowers and passed to a lender or lenders. The embodiments described herein can facilitate such references, improve their reliability, and employ them to make more accurate predictions of repayment behavior from whatever credit information is available about the maker of the reference, the subject of the reference, and previous subjects of references by the same maker of the reference.

As will become clear, the embodiments described herein are described with reference to three interacting components. These three components include:

1. The overall process of obtaining references of prospective borrowers in a specified and controlled way;
2. The sub-process by which credit assessment tools and methods are applied to data accumulated from: 1) available data about the subject credit applicant, and 2) data about others liked to the applicant by references about or made by the applicant; and
3. The computing systems required to perform the evaluation of credit applications in such a way as to take full advantage of the combined relevant data linked by references.

The overall process, according to certain embodiments, is described in relation to FIGS. 1-4. Before turning to FIG. 1, however, it should be noted that the described process relies upon references. Such a "reference" can be a communication from its maker to a lender or prospective lender. The reference should include a statement that the subject person or organization would be very likely to repay an extension of credit or to use a financial account as agreed. Such a reference can be a written, verbal, or electronic communication and may or may not, depending on the embodiment and/or implementation, specify the type of financial account or extension of credit for which its subject is recommended.

Such a reference should also clearly specify the subject individual or organization, should be known with reasonable certainty to be from the person or organization identified as the maker of the reference, and should be recorded in a durable form suitable for storage over at least several years. References should also be maintained as secret, e.g., documents accessible only to the maker of the reference and the intended recipient of the reference, and possibly employees and agents of the intended recipient. It can also be useful for a reference to specify the relationship of the maker of the reference to the subject of the reference. References should be handled so that it is possible to truthfully assure makers of references or would-be makers of references that reference subjects will not be able to determine whether or not a reference has been made, nor the content of any reference.

It should be noted that the specificity of references and the variety of alternative references allowed are variable and will depend on the requirements of a particular implementation.

Further, the term "Application" will be used herein to refer to requests for credit or a financial account relationship. Applications used in the embodiments described herein need not differ from those used in conventional credit programs. An application should clearly identify the party or organization for which the application is made, e.g., the subject or "applicant", and the maker of the application, which is often the subject. Many applications will contain substantially more information required or volunteered to assist in the evaluation of credit risk and often authorization to conduct inquiries.

It will be understood that a structured-reference credit process as described herein can be applied to a wide range of financial and credit services.

As described herein, the credit history information related to one or more persons or organizations can be associated with an applicant and influence decisions about the creditworthiness of the applicant. Because credit history data use is often regulated by governments, there may be laws or regulations designed to protect credit privacy or the prerogatives of financial institutions, that affect a lending system employing the embodiments described herein and require care in the design of policies and practices to support specific implementations. If regulations prevent the use of some of the associated credit information as described herein, then the remaining information can still be used and can still add predictive power to credit risk assessments. In many jurisdictions, careful explanation of a structured-reference credit system as described herein combined with appropriate disclosures and permissions will resolve any regulatory issues.

In general, the embodiments described herein comply with the intentions of most credit information regulations worldwide; however, there may be conflict with specific details. Since all uses of credit data described herein can be with the knowledge and consent of the subject parties, providing proper notices are provided, and there are due incentives and rewards for sharing credit data, carefully designed policies can avoid conflicts in most jurisdictions. Still, in some jurisdictions there may be some aspects of credit data use that cannot be resolved without government action.

The processes described in the figures relate to the actions of several interacting parties. These parties include the persons or organizations involved. "Organizations" as used herein includes businesses of any kind, including, e.g., banks, families, associations and non-profit organizations, religious bodies, and any other groups of persons capable of entering into financial transactions under the laws and practices of the jurisdictions in which the processes described are implemented.

Certain specific parties include a "lender", a "referencer", a "prospective referencer", a "customer", a "prospective customer", and "applicants".

A lender can be a primary lender, i.e., a person or organization desiring and planning to extend financial credit or provide financial account services that will primarily or incidentally extend some financial credit or involve some trust on the part of the lender that the recipient of said credit or account service will behave in accord with agreed-upon terms. Also, a lender can be a combination of such primary lenders operating in cooperation or in accordance with a marketplace, exchange, or association. A lender can also be a primary lender or combination of primary lenders and a person, persons, or organization employed by, owned by, or partnered with the primary lender or primary lenders, optionally serving as their agent, consultant or employee.

A referencer can be a person or organization providing a reference to a lender, i.e., a lender of the kind described in the preceding paragraph, stating that a subject person or organization would be very likely to repay an extension of credit or use a financial account as agreed. Referencers are expected to often be senior to those they reference. For example, they can be relatives, employers, community members, etc. The social relationship to referencers will vary greatly by culture, but it can be preferable when well-established referencers with strong credit records and some financial wisdom are the rule.

A prospective referencer can be a person or organization from which the lender would willingly receive a reference and not dismiss the reference as unusable solely because of the identity of its maker.

A customer can be a person or organization that concludes an agreement with the lender for an extension of credit from the lender to the customer or for financial account services or both.

It should be noted that reference-based lending as described herein improves credit risk evaluation; however, even though explicit extensions of credit may not be made, more often than not, an account relationship involves an implicit extension of credit, or more broadly, financial trust. This is because most non-credit account relationships have vulnerabilities to misuse by accountholders even where there is no explicit credit. For example, most demand deposit systems incorporate some reliance on trust, intended or not, but nonetheless known by banker and customer. The customer usually can cause the banker loss by fraud, negligence or misbehavior, even if only an administrative cost without unjust enrichment of the customer. Thus, though there is no explicit extension of credit, there is an extension of financial trust that generally calls for evaluation of the risk that trust will be abused, which can be provided to a greater degree by employing the embodiments described herein.

A prospective customer can be a person or organization that can become a customer of the lender by opening a financial services account or receiving an extension of financial credit. A prospective customer can concurrently be a customer as well.

An applicant can be a prospective customer that can be the subject of an application to a lender for an extension of credit or financial account services from the lender.

Depending on the embodiment, it can be important that references be kept confidential so that the possible subject of a reference is unable to obtain independent verification of whether or not a possible referencer is in fact a referencer for said possible subject. In this way, possible referencers can then say what they will without fear the possible subject can determine the truth of whether or not a particular reference was ever made. This mechanism can be essential to avoid coercion or extortion of references, even if by socially acceptable means. Therefore, the lender should take care not to behave in any way that unambiguously indicates the existence or absence of any particular reference or to allow leaks of information about the existence of references, or their content.

FIG. 1 is a flow chart illustrating an example process for structured reference credit in accordance with one embodiment. In step 102, a lender can select prospective referencers. Whether before, after or amid solicitation of prospective referencers (step 104), at some point, the lender should select prospective referencers (step 102) whom the lender can trust as sources of references and for whom sufficient information is known to be of help in overcoming an applicant's lack of credit history information.

The process of selecting referencers will be discussed in more detail with respect to FIG. 2.

In step 104, the lender can then solicit prospective referencers to make references. Solicitation of referencers can be done before, after, in synchronization with or independently, e.g., in parallel with, the selection of prospective referencers in step 102. The appeal to prospective referencers to be involved can be a result of civic virtues, personal prestige, family loyalty, loyalty to employees, financial incentives, aggrandizing perquisites or many other motivators depending upon specifics of the credit program and the host culture.

The solicitation of prospective referencers will be described in detail with respect to FIG. 3.

In step 106, some prospective referencers in fact become referencers, perhaps once again, by creating a reference recommending a prospective customer and communicating it to a lender. In general, prospective referencers are expected to have more available credit history data and related data suitable for estimation of creditworthiness than do applicants. Often, they will also have established communications with a lender, e.g., via Internet banking, which is widespread in many third-world countries, ATM use, branch visits, mail or email correspondence, or other means.

The identity of the referencer should be capable of being established with confidence by the lender. Usually, this confidence is the result of an existing communications practice and its established security features.

In step 108, the lender can select among the prospective customers those to be solicited, and select the credit product(s) for which to solicit. The selection of prospective customers to solicit should be done with care so that the confidentiality of the existence of a reference is not compromised. Solicitation of prospective customers to apply can be on an individual basis, to selected subpopulation or to the population at large, as the goals and environment of the lending project demand.

In solicitation programs like broadcast or sign campaigns designed to reach a broad audience not limited to those receiving or likely to receive the recommendation of a reference, concerns about revealing the existence of references by solicitation steps are less pressing. For such broad solicitations, the selection of the product or products to feature in solicitations can be a conventional marketing issue to be resolved in conventional ways. When a narrower selection is used that targets only likely or actual subjects of references, then care should be taken to protect reference confidentiality. Means of doing this include introducing randomness into the selection process so that selection for solicitation is not necessarily indicative of a fixed number of, or even one, reference received.

Solicitations can be directed at those already identified as prospective customers or those who may be so identified in the future. As in conventional consumer lending in full-credit-data environments, when narrow prospect selection is used, a preliminary analysis can be applied to individual prospects, which determines the optimal credit product or service to offer to the specific prospect.

Figure 4:
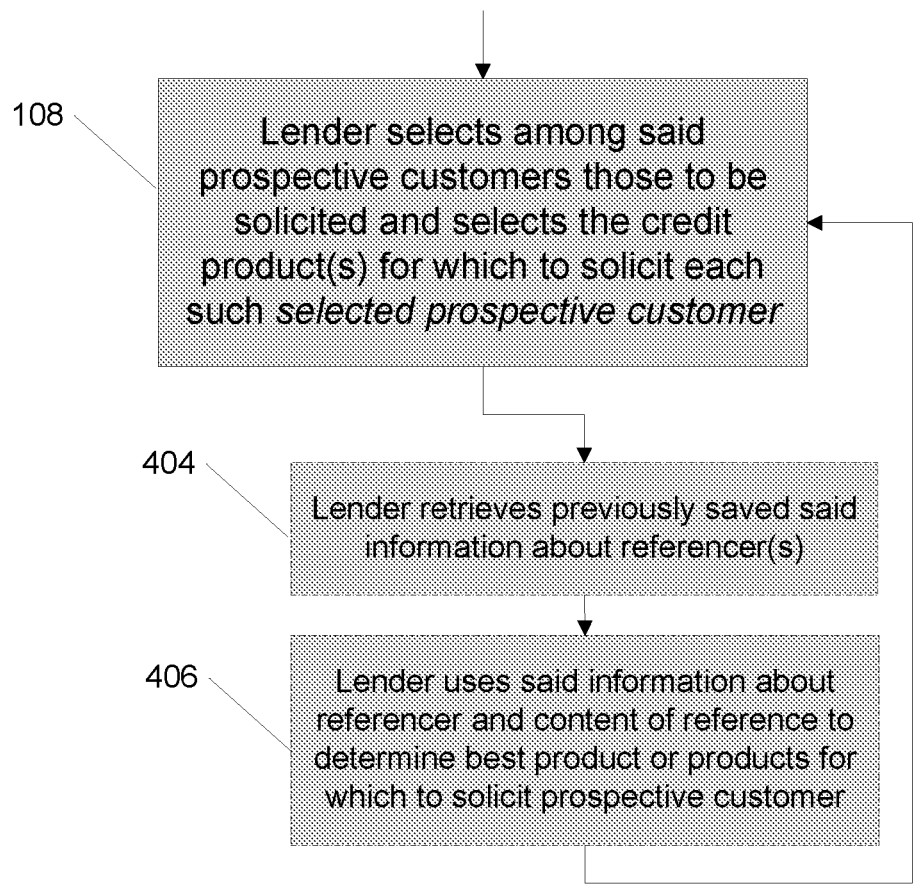
FIG. 4 is a flow chart illustrating an example process for selecting among prospective customers within the process of FIG. 1 in accordance with one embodiment.

The process of selecting prospective customers in described in detail with respect to FIG. 4.

In step 110, the lender can solicit the selected prospective customers. The means of solicitation of selected prospective customers can vary widely just as it does in conventional credit practice. In certain embodiments, solicitations in a structured reference credit program as described herein can encourage prospective customers to seek references from others with more established credit.

In step 112, some of the selected prospective customers will make applications. In general, it is assumed that some prospective customers will make applications and submit them to the lender.

In step 114, an application decision can be made. This step will be described in detail with respect to FIGS. 5-11. It should be noted that the application decision sub-process results in three possible outcomes: 1) application accepted, 2) a counteroffer is made, or 3) the application is rejected without a counteroffer (step 116). Depending upon the applicant's response to numbers 1 and 2 above, these lead to one of two results: 1) the applicant becomes a customer step 120, perhaps not for the first time, by virtue of the lender's acceptance of the application (step 116), or by the applicant's acceptance of the lender's counteroffer (step 118), or 2) the application leads to no new extension of credit or account relationship.

Thus, in step 120, the accepted applicants become customers. Once an application or counteroffer is accepted by both applicant and lender, subsequent steps for account opening or loan funding can, e.g., be as they would be for a conventional credit program, except perhaps that care is taken to record the subsequent credit behavior of the customer. Customers can also become part of the pool of potential referencers as they build credit data histories that can be used to support decisions about multiple prospective customers through the reference process repeated in step 102. This can be referred to as compounding mechanism that drives rapid growth of credit availability in structured-reference credit programs.

In step 122, the lender can encourage selected referencers in relation to a reference made. For example, in some programs, this will involve some specific reward or recognition of the referencer of a new customer enrolled in step 120.

Referencers may be motivated by many different desires or expectations, but in many contexts, the speed of credit expansion can be further increased by encouraging referencers who provide references that lead to new or expanded customers, especially customers who prove to be credit worthy and who, themselves, serve as referencers of desirable new customers. Encouragement can simply be congratulatory or can involve tangible or intangible incentives.

Often the natural expansion of the referencer's credibility and influence with the lender is itself a significant encouragement. As will be described in relation to application evaluation, the more a referencer references prospective customers who become actual customers and who prove to be desirable and valuable customers, the greater the referencer's influence with the lender and the more impact a reference by that referencer will have.

Generally, it is wise to inform prospective referencers about how their influence is tied to the outcomes of their references and how their influence can grow with success. Though most jurisdictions prevent sharing customer credit data with a referencer for the customer, still, the expansion of the influence of a referencer due to the success of past reference subjects can be reported and may, by itself, provide significant encouragement to a referencer.

The description above has shown how confidential references can be obtained and coupled with an application process, thereby linking the credit history of the referencer to an applicant. The discussion below describe how references can be used to link credit data and how that linked data can be used to great advantage in the evaluation of applications.

Figure 2:
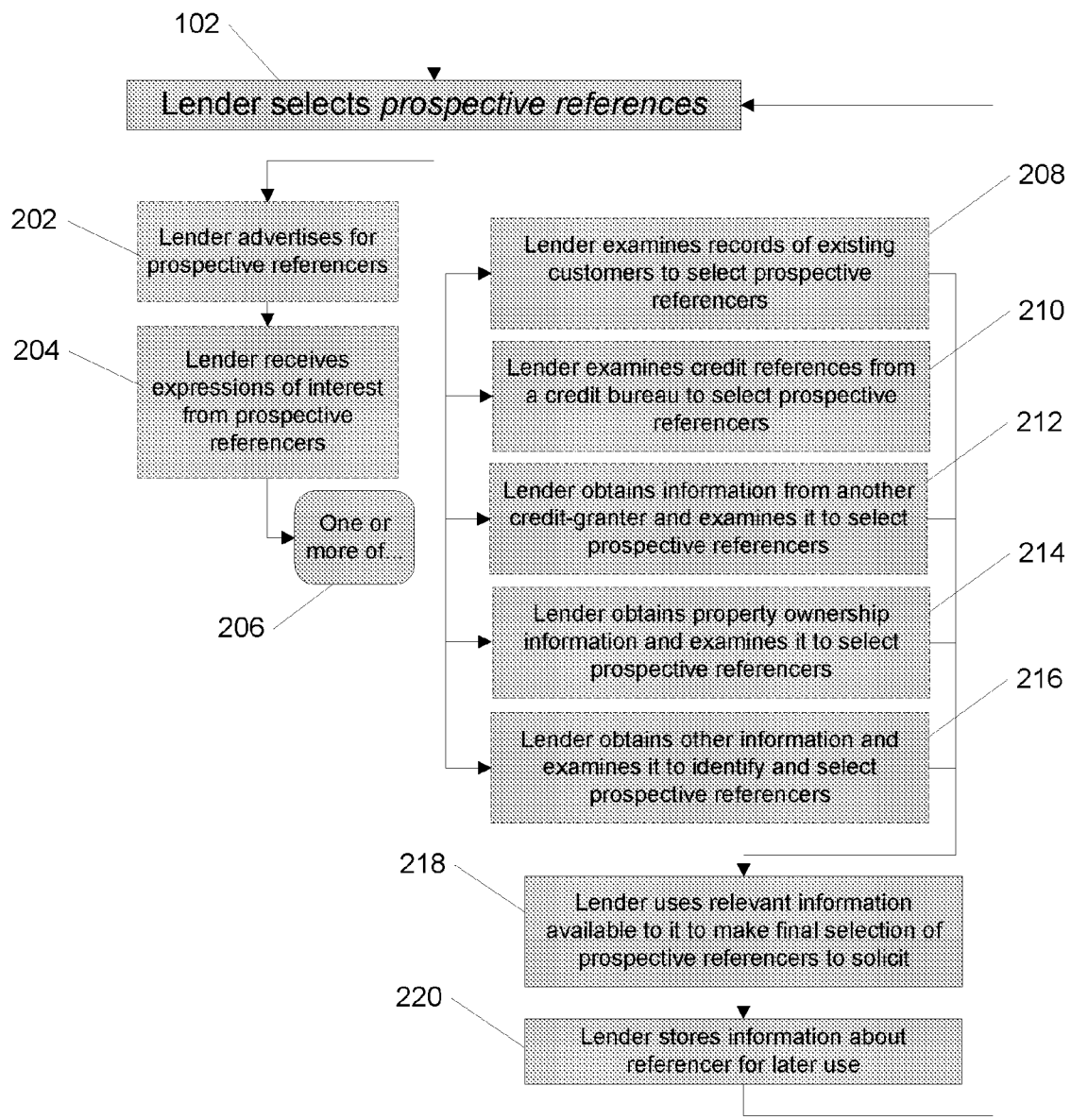
FIG. 2 is a flow chart illustrating an example process for selecting a prospective client within the process of FIG. 1 in accordance with one embodiment.

First, however, FIG. 2 is a flow chart illustrating in more detail an example process for selecting prospective referencers (step 102) in accordance with one embodiment. As can be seen, in step 202, the lender can advertise for perspective referencers. In step 204, the lender can receive an expression of interest form one or more potential referencers. In step 206, the responding potential referencers can be categorized so that information can be gathered with respect to each potential referencer in steps 208-216. For example, some of the potential referencers may be categorized as existing customers, in which case the lender can examine the records of the existing customers in step 208.

Other methods of vetting potential referencers, e.g., depending on their classification, can include: examining credit references from credit bureaus (step 210), obtaining information from another credit-granter (step 212), obtaining property ownership information (step 214), obtaining information that will allow the lender to identify and select referencers (step 216).

In step 218, the lender can then use the information gathered in steps 208-216 to select prospective referencers. This information can then be stored in step 220 for later use.

Figure 3:
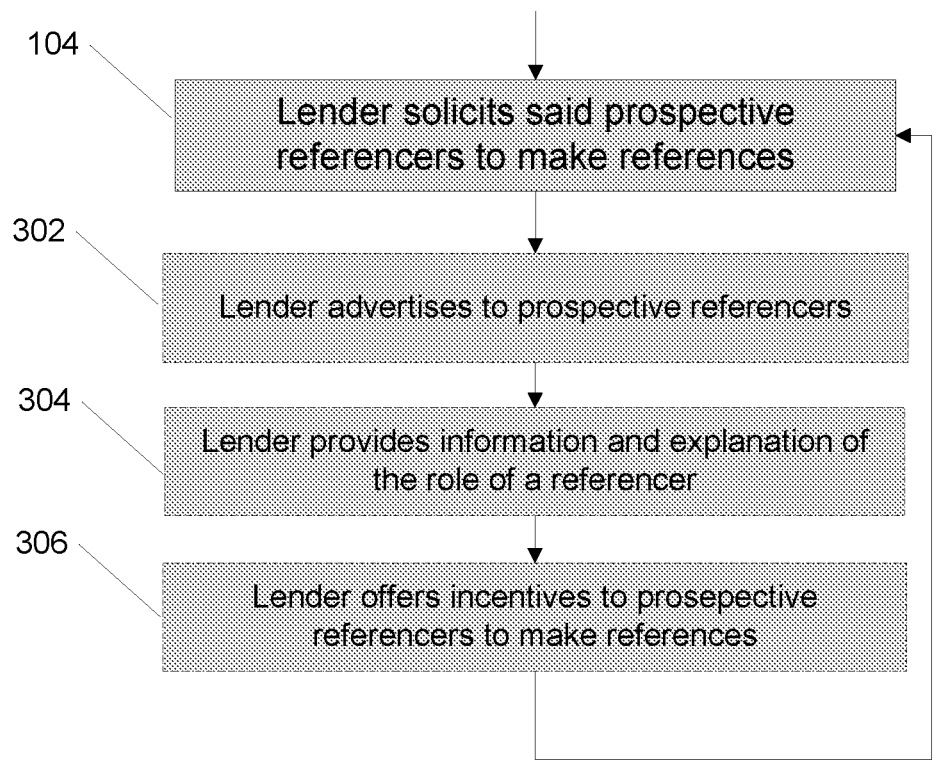
FIG. 3 is a flow chart illustrating an example process for soliciting prospective referencers within the process of FIG. 1 in accordance with one embodiment.

FIG. 3 is a flow chart illustrating in more detail an example process for soliciting a prospective referencer (step 104) in accordance with one embodiment. In step 302, the lender can advertise to prospective referencers and can provide information and an explanation of the role, either as part of the advertisement or separately as a follow up, in step 304. In step 306, the lender can then provide incentives to potential referencers to entice them to participate.

FIG. 4 is a flow chart illustrating in more detail an example process for selecting prospective customers (step 108) in accordance with one embodiment. This supposes of course that a reference was first made by a referencer with respect to the potential customer (step 106). Then in step 404, the lender can retrieve the information previously saved (step 220) related to the referencer, and use the information as well as the content of the reference to determine the best products to offer the prospective customer in step 406.

While some of the steps above can be carried out without the aid of automation, it will be clear that other steps should be automated. Such automation requires customized software and hardware components.

Accordingly, to get the full benefit from the overall process described above a decision device configured to implement one or more decision sub-processes, which together can perform the evaluation and recommendation steps described above is necessary.

Figure 8A:
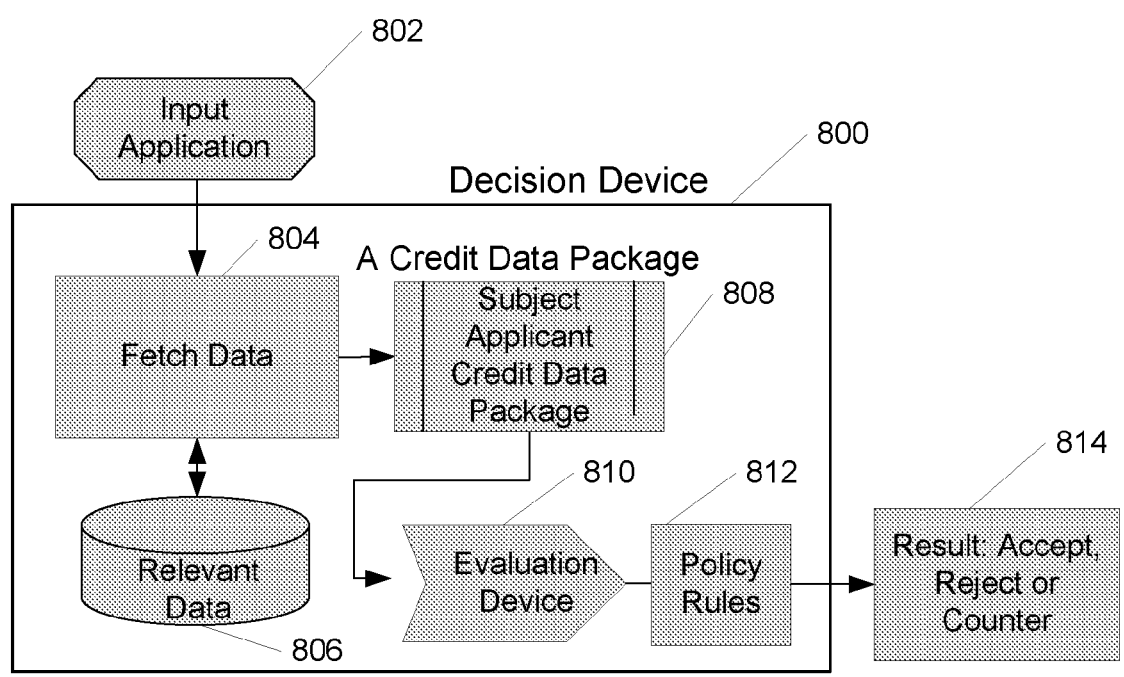
FIG. 8A is a diagram illustrating a conventional credit decision device.
Figure 8B:
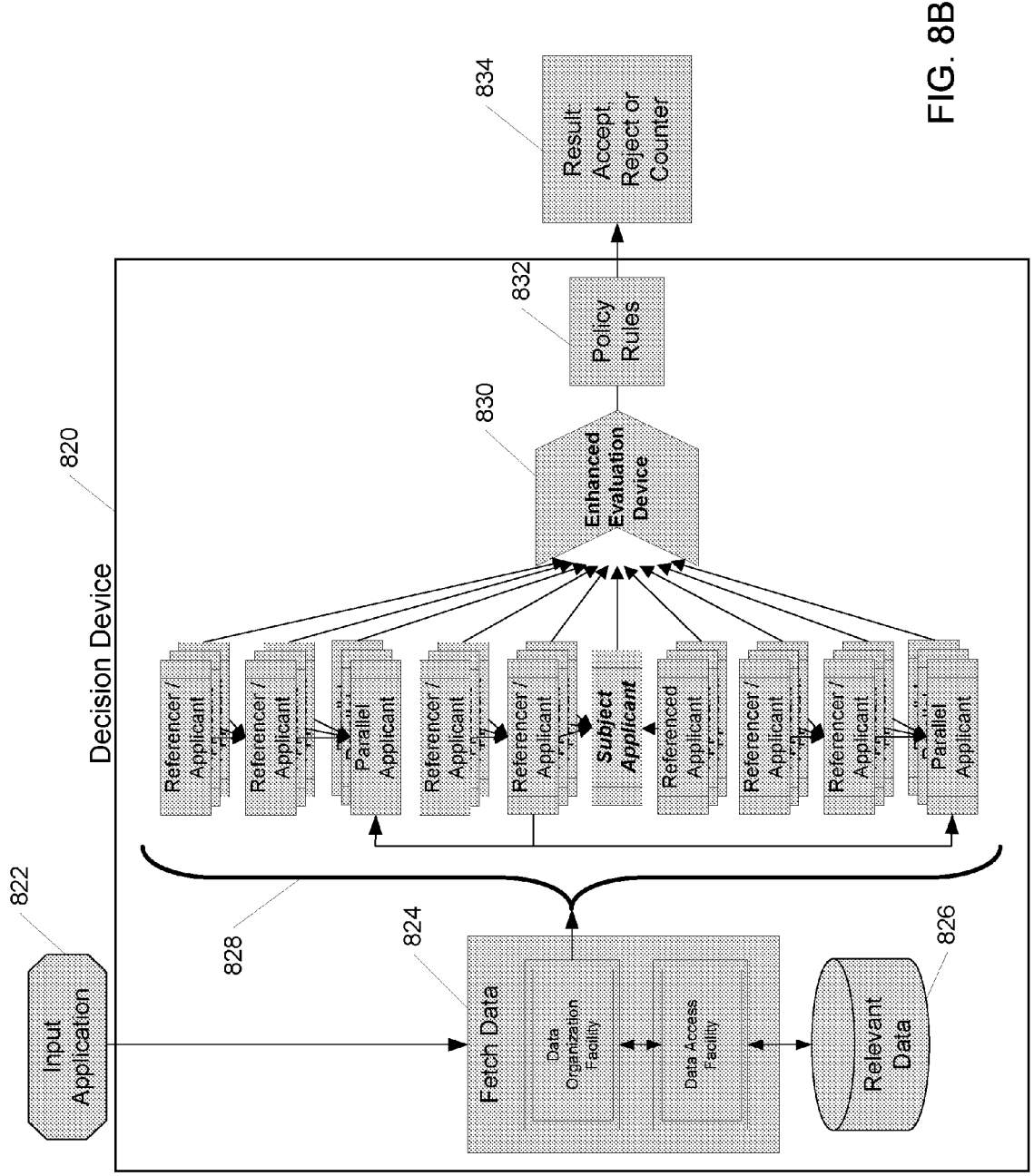
FIG. 8B is a diagram illustrating an example credit decision device in accordance with one embodiment.

FIG. 8B is a diagram illustrating a decision device 820 configured in accordance with one example embodiment. It will be understood that decision device 820 can comprise one or more computers, servers, routers, API's, software programs, firmware, user interfaces, databases, network interfaces, etc., required to carry out the processes and sub-processes described herein. For example, many of the components of FIG. 820 can be implemented via a processor implementing a controlling program and/or set of coordinated programs. The programs can be stored in memory or storage interfaced with the processor and can be accessed by the processor and configured to cause the processor to implement the required steps needed to implement the processes described herein.

Still referring to FIG. 8B, it can be seen that device 820 can comprise a fetch data component 824, which can comprise a data access facility 840 and a data organization facility 842, a database 826, evaluation device 830, and rules engine 832. Decision device 820 can be configured to perform a decision sub-process.

In certain embodiments, the decision sub-process can operate on individual applications serially. Thus, device 820 can be configured to accept an application 822 as input, operate using the input application 822 and the relevant data retrieved from database 826 and produce a recommended decision 814 to accept, reject, or counter the input application, and if recommending a counter, supply a recommended counteroffer. Depending on the embodiment, multiple instances of decision device 820 can be invoked to execute multiple instances of the decision sub-process in parallel, e.g., on one or more computers.

Data access facility 842 can be configured to access any relevant data stored in database 826, and optionally with external databases maintained by others such as credit bureau databases (not shown), in response to a new application 822. Database 826 can be configured to store relevant data including:

the lender's records of references;
the lender's records of applications;
the lender's history of activity on accounts and loans;
credit history information from a source or sources independent of the lender (if such sources such as credit bureaus or public data vendors are available); and
records of references and applications received by other lenders if share in an accessible data store or service.

Thus, data access facility 842 can be configured to use the identity of a subject applicant, prospective referencer, referencer, prospective customer or customer described in the relevant data to acquire information in database 826 in response to an application 822. Data organization facility 840 can be configured to isolate and organize subsets of the relevant data selected and obtained using data access facility 842. This will be described in more detail below with respect to FIGS. 5-7.

Decision device 820 can require one or more evaluation devices 830, which can incorporate one or more credit-outcome models. These models (or rules sets) can employ conventional technology for credit risk assessment; however, they can apply that technology to more diverse and complex input data records 828 than used with conventional credit risk models. The credit-outcome models can, e.g., comprise neural network models, a multivariate predictive mathematical model, constrained optimization models, regression models, CART models, rules sets or other types of statistical models, combinations of models, and rules or combinations of any or all of these in specialized segments tailored to the behavior of identifiable subpopulations. Such credit-outcome models can be configured to accept application, credit, reference and account history data as inputs and produce as outputs evaluations of the creditworthiness of a subject application, the creditworthiness of subject applicants, and the expected profitability of a loan or other extension of credit made on specified terms to the applicants of a subject application. Credit-outcome models can incorporate multiple models of different kinds combined with both analytical rules and policy rules.

Rules engine 832 can be configured to apply policy rules, which govern formation of a recommendation 834 for appropriate disposition of an application 822 submitted to decision device 820, to the evaluations provided by evaluation device 830.

Figure 5:
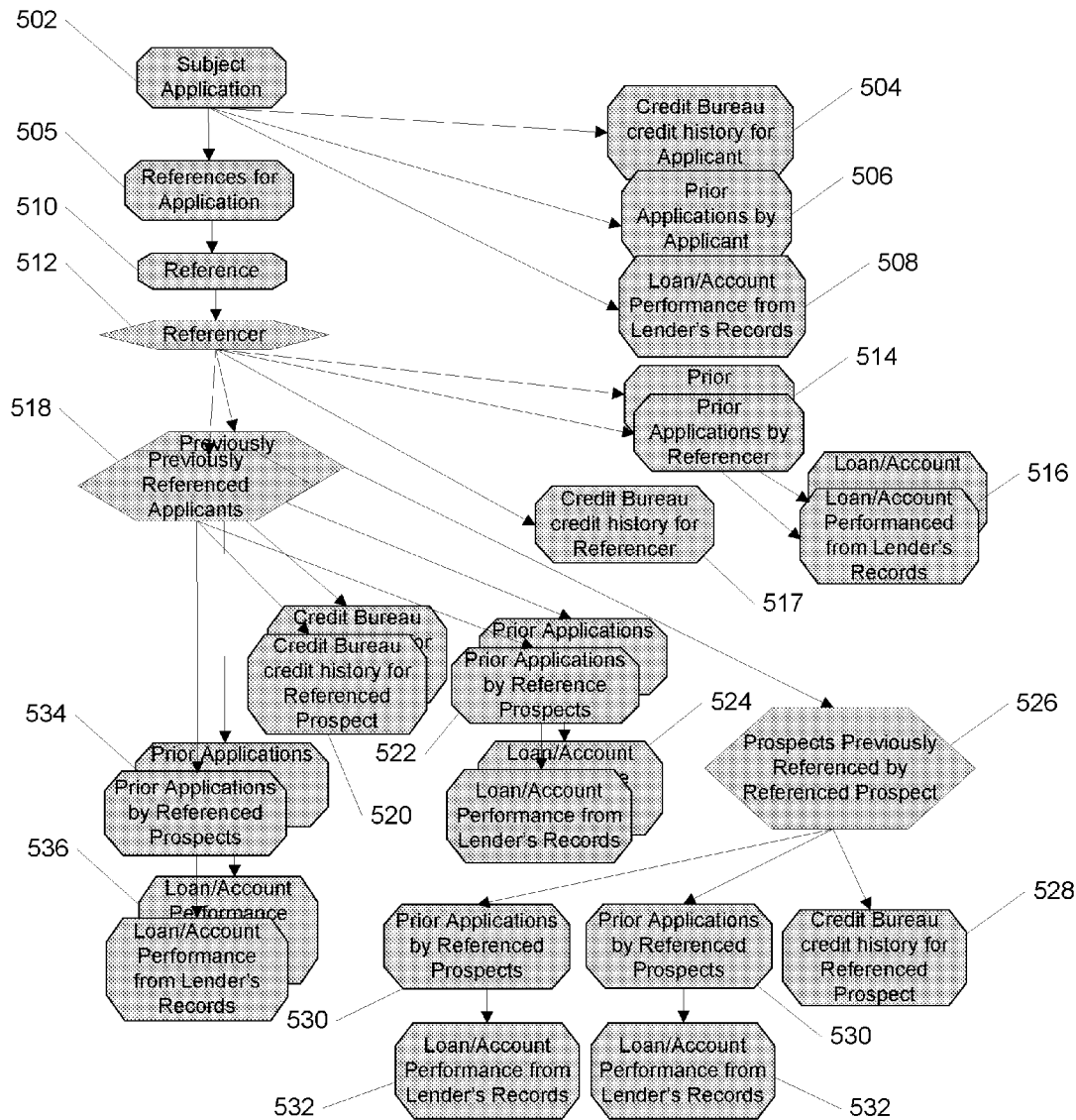
FIGS. 5-7 are diagrams illustrating the retrieval, isolation and linking of information related to a subject applicant in order to generate a plurality of data packages for use in making a recommendation within the process of FIG. 1 in accordance with one embodiment.

FIG. 5 is a diagram illustrating an example of the cascade of data records that can be retrieved by data access facility 842 and assembled by data organization facility 840 in response to an input application 822 and the relevant data using references and prior applications to link historical information for multiple applicants, customers, and prospective customers.

Thus, as can be seen, the subject 502 of application 822 can be linked to credit bureau information 504, prior applications 506, and lender's records 508 for the subject. The subject 502 can also be linked with various references 505, which will include reference information 510, including the identity of the referencers 512. The identity of the referencers can be linked with prior applications 514 by the referencers, lender's records 516, and credit bureau information 517.

The referencers 512 can also be linked with information related to previously referenced applicants 518. This information can include credit bureau information 520, prior applications 522 and 534, lender's records 524 and 536, as well as information related to prospects 526 previously referenced by a given referenced prospect. These prospects 526 can then be linked with credit bureau information 528, previous applications 530, and lender's records 532.

Figure 6:
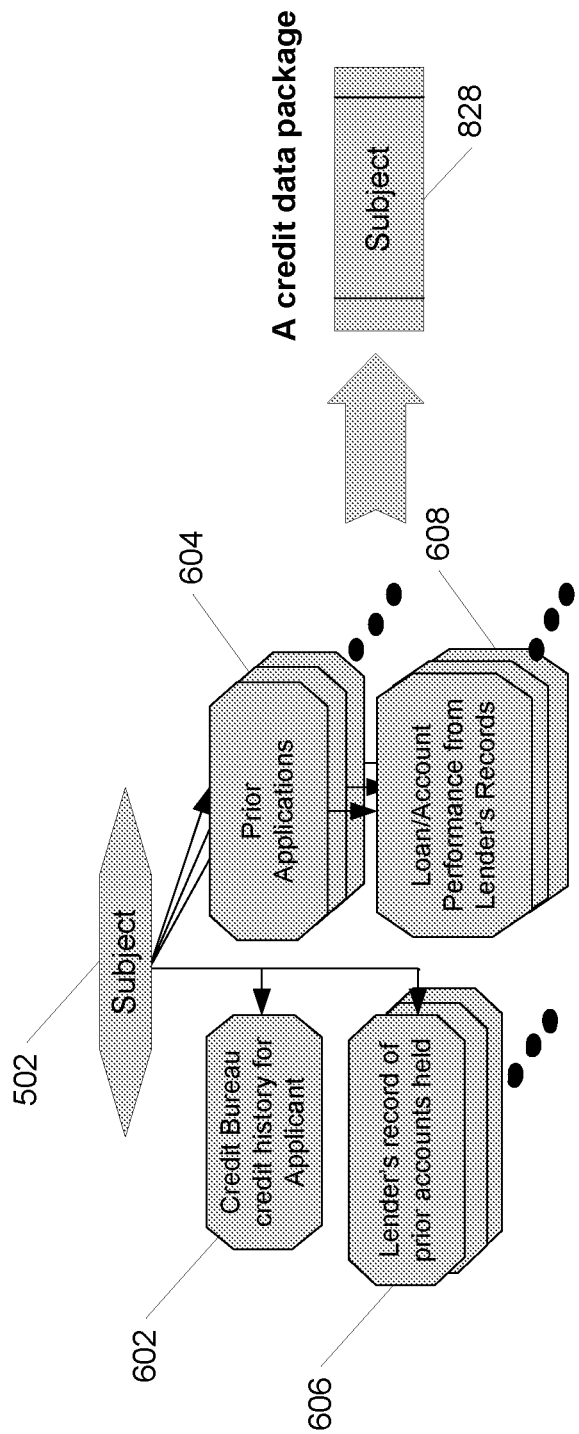

All of the information, e.g., illustrated in FIG. 5, can then be consolidated into a group of related data packages 828 as illustrated in FIG. 8B. FIG. 6 is a diagram illustrating a simplifying consolidation processes for consolidating the information, e.g., illustrated in FIG. 5, into one of the several types of records and then into a credit data package 828. Thus, as can be seen, the information, e.g., illustrated in FIG. 5 can be organized into credit bureau records 602, prior application records 604, lender's records of prior accounts 606, and lender's records of prior account performance 608. These records can then be used to generate one or more data packages 828.

It will be understood that the number and types of records illustrated in FIG. 6 are by way of example only and that more or less records can be used, including different typos of records.

Figure 7:
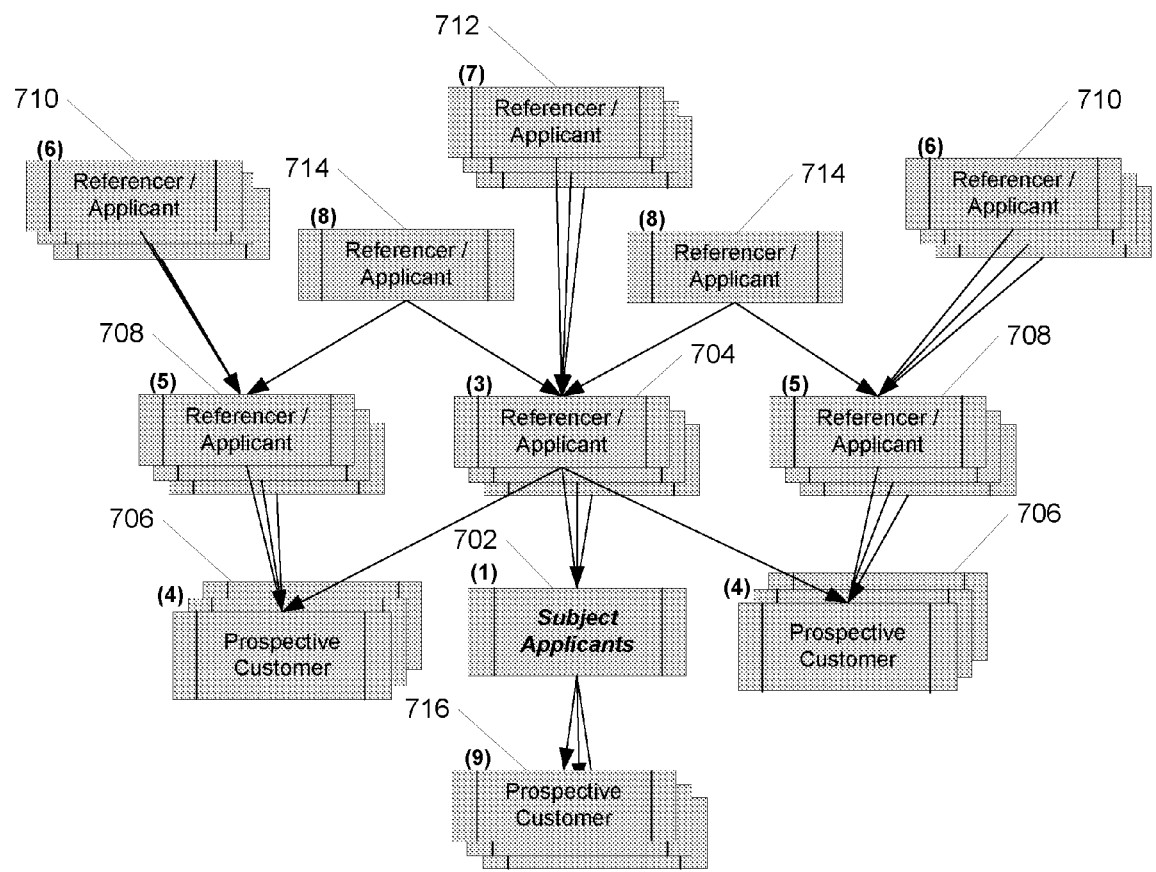

Thus, data organization facility 840 can be configured to progressively accesses and organizes historical records, using the capabilities of the data access facility 842, by following a series of identity links between applications, references, and the credit data stored in the relevant data. FIG. 7 is a diagram illustrating the steps, or links data organization facility 840 can be configured to follow in accordance with one example embodiment.

First, data organization facility 840 can be configured to access all available records 702 about all applicants 502 identified on the input application 822, and all available records about all references naming any applicants 502 identified on the input application. Then, data organization facility 840 can access all available records 704 about all referencers making any of the references of applicant 502 identified in records 702. Data organization facility 840 can then be configured to access all available records 706 about all prospective customers referenced by those referencers identified in records 704. In certain embodiments, any duplicate data about any customers who are also named as applicants on the input application 822 can be eliminated.

Data organization facility 840 can be configured to then access all available records 708 about all referencers making references naming any of the prospective customers identified in records 706. Then, data organization facility 840 can access all available records 710 about all referencers making references naming any of the referencers identified in records 708, and can then access all available records 712 about all referencers having made references about any of those referencers having made references naming any of the applicants named in the input application 502, e.g., the referencers identified in records 710.

Data organization facility 840 can be configured to then identify all those referencers identified in records 710 and 712 an can access records 714 related to these referencers. Data organization facility 840 can then access records 716 related to all prospective customers named in references by any of the applicants named in the input application 502. Finally, data organization facility 840 can be configured to access other records as warranted by the predictive value of discovered data.

Data organization facility 840 can be configured to accumulate records, e.g., those illustrated in FIG. 7, and prepare them into a structure, i.e., a data package 828 suitable for input into credit-outcome models. The process of generating the requisite structure 828 can be viewed as the first phase of the decision sub-process described herein.

The set of records obtained by the sequence described above is a superset of the set available to conventional lending that is normally confined to only the conventional credit data packages 808 for those applicants 502 named in a conventional input application 822. Drawing 8A shows the evaluation process step as executed in conventional credit programs. Drawing 9 shows an example of the data available to an evaluation device in a structured-reference credit program as described herein.

As collected credit data packages 828 become more remotely linked to named applicants, their predictive value is reduced, but not eliminated.

The weight to give individual credit data packages 828 can depend both upon the relationship of the subject of the credit data package 828 to named applicants and the content of the package. Credit-outcome models should be trained on actual data of this form with tagging of each credit data package's subject's relationship to applicants named in the input application. In this way, the output of credit outcome models reflects the predictive influence, be it great or small, of each credit data package 828 found in the first phase of the decision sub-process.

Drawing 9 shows an illustrative set of input credit data packages 828 that can be passed to an evaluation device 830 containing credit-outcome models and rules designed to accept the wide range of data records found in such an input set in accordance with one embodiment. Though the credit-outcome models can use conventional technology, it must be applied to many more training cases than usual in order to well-specify the many parameters associated with the many records associated with an input set of this kind.

In general, there are two practical approaches to "broadening" credit-outcome models to build evaluation devices 830 that can deal with the complex input data 828 generated in structured-reference credit programs as described herein: First, models with many inputs can be built, taking care to prune inputs found to be redundant or lacking in predictive value across many cases. To succeed in this, a modeling technology suitable to dealing with many inputs, frequent missing data, and complex input interaction should be used. Typically neural networks or similar algorithms have performed best in such applications.

Figure 9:
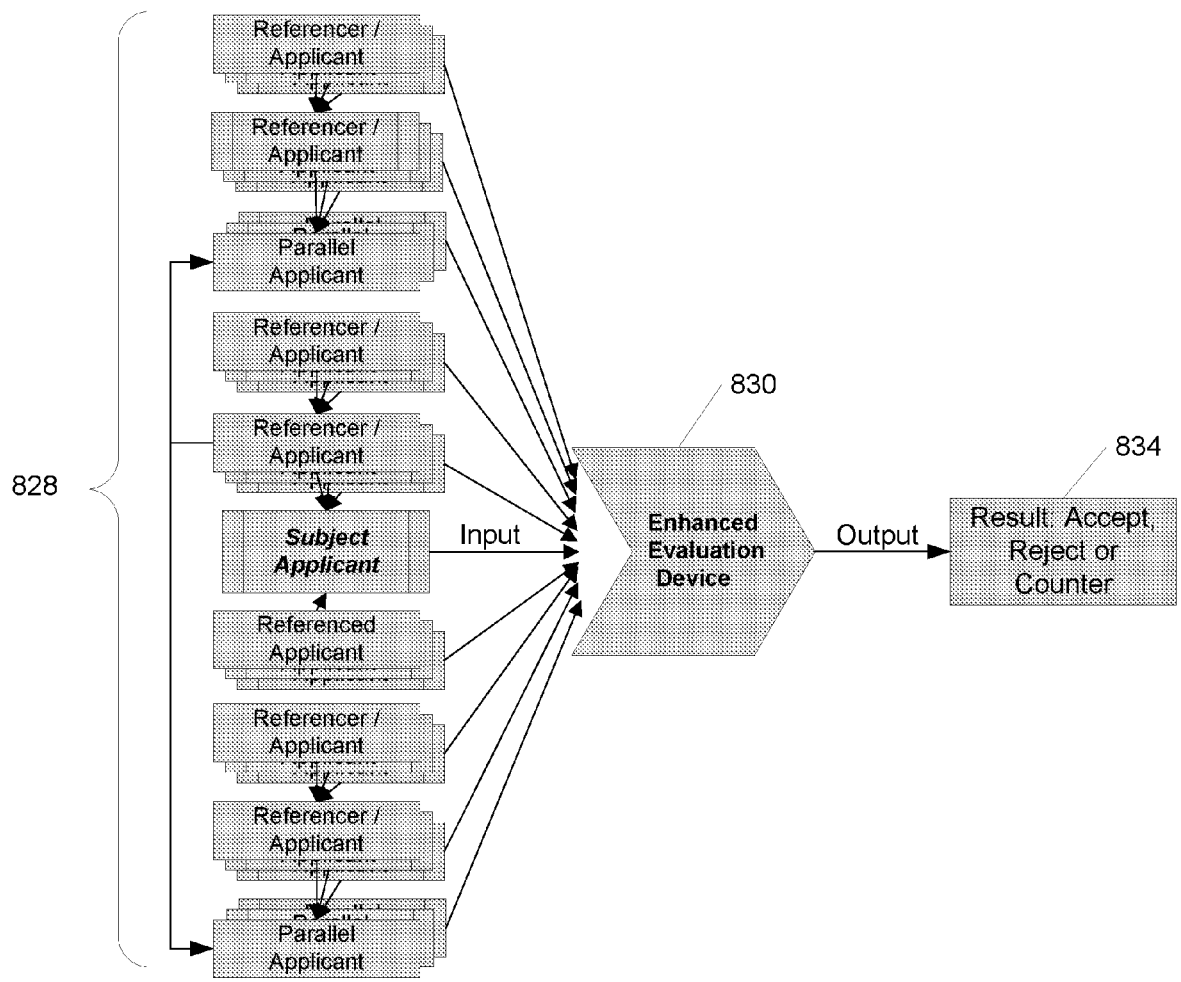
FIG. 9 is a diagram illustrating an example evaluation engine that can be included in the decision device of FIG. 8B in accordance with one embodiment.
Figure 10:
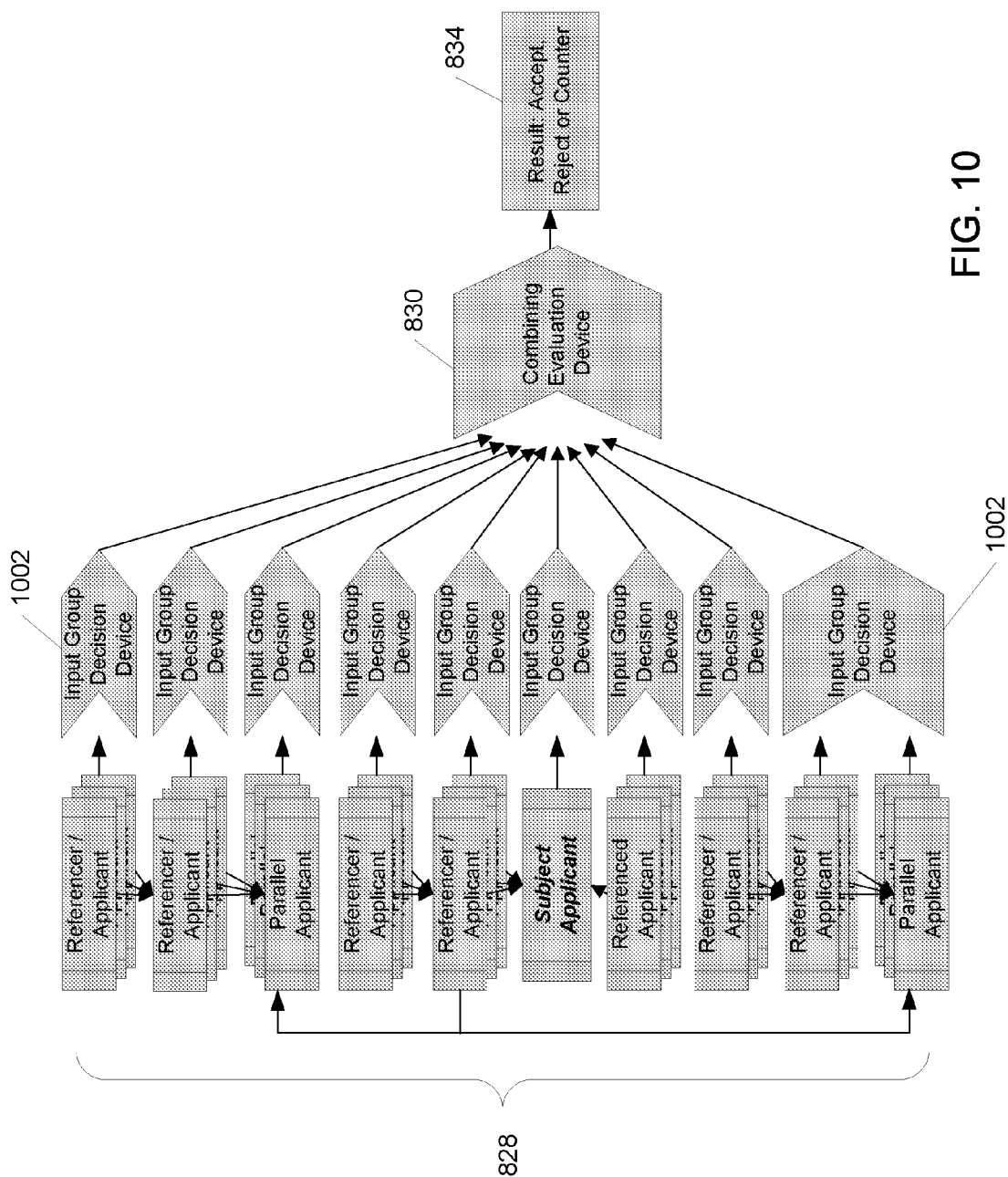
FIG. 10 is a diagram illustrating an example plurality of evaluation engines that can be included in the decision device of FIG. 8B in accordance with one embodiment.

Second, the problem can be decomposed and a series of narrower, specialized models can be built tailored to specific classes of fewer inputs and feeding into a model or models 1002 used to consolidate the results to a final evaluation. Such an arrangement is shown in FIG. 10. It should be noted that for the best statistical performance, the embodiment of FIG. 9 can be preferable. But the embodiment of FIG. 10 can be easier to maintain and more cost-effective, especially if historical data is difficult to obtain, and can be preferable for these reasons. Moreover, the embodiment of FIG. 10 can be used as a stepping-stone to single model implementations such as is illustrated in FIG. 9.

For example, in early deployments for a particular program, data of the breadth and interrelatedness found in production use may be difficult to obtain where there is little prior data from structured-reference credit programs as described herein. In such cases, it can be preferable to initially implement the embodiment illustrated in FIG. 10 and move to the single-model approach illustrated in FIG. 9 as more data from structured-reference credit programs becomes available.

It should be noted that a structured-reference credit program as described herein is intended to be used in environments where credit history data is sparse. Also, the methods used in such a structured-reference credit program will tend to accumulate data from wider and more disparate sources than do conventional credit programs. Where an application would be rejected for lack of data in a conventional program, it may well have substantial, predictive data in such a structured-reference credit program, but some of that data may be very weakly predictive. Therefore, it is even more important than in conventional lending that the confidence warranted by credit evaluations itself be estimated with care.

Figure 11:
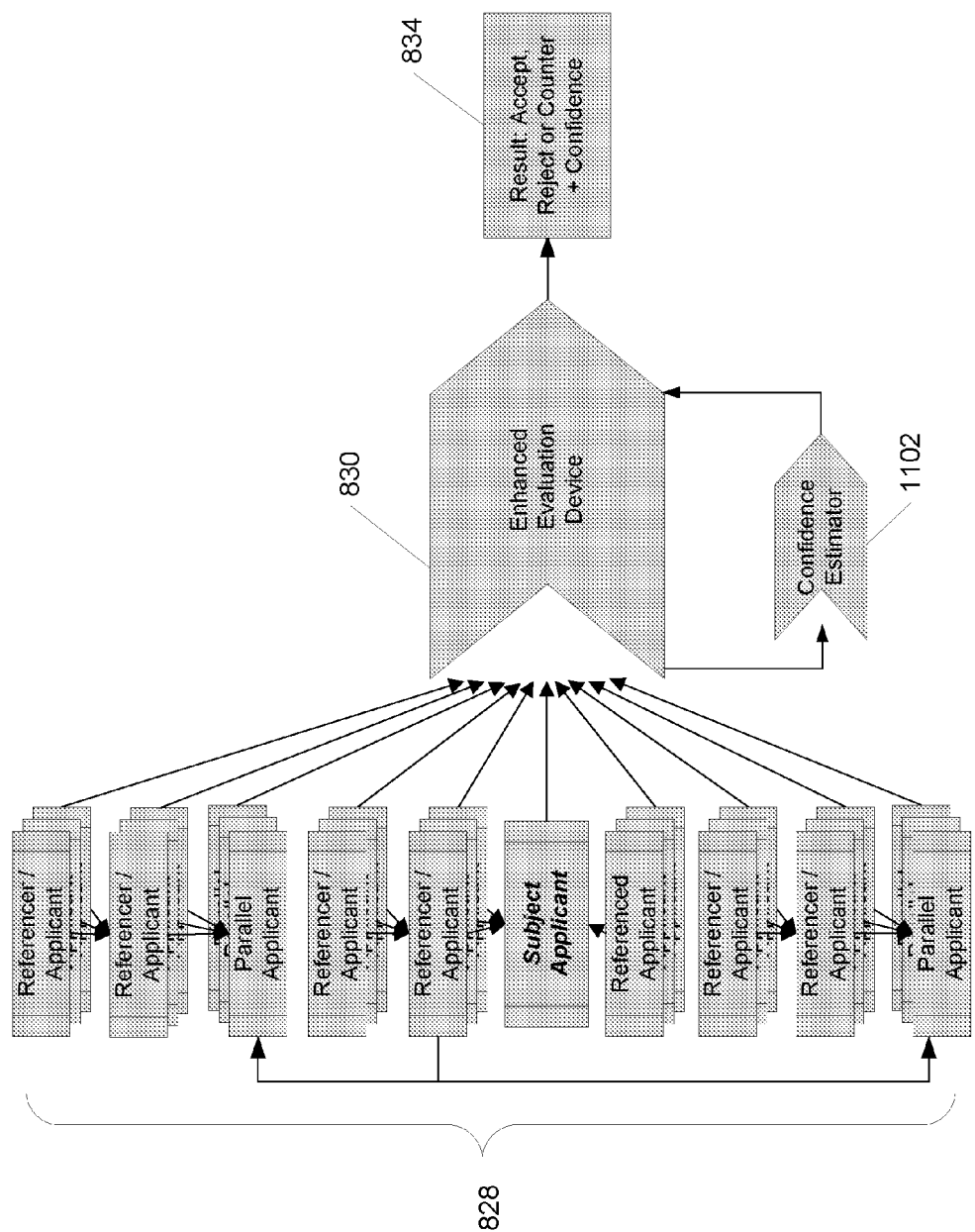
FIG. 11 is a diagram illustrating an example confidence estimator coupled with an evaluation engine both of which can be included in the decision device of FIG. 8B in accordance with one embodiment.

To accomplish this, evaluation device 820 should be augmented with an additional model or models 1102, as illustrated in FIG. 11, developed to estimate the accuracy and reliability of the application creditworthiness estimate output of the evaluation device 830 itself Again, carefully applied, conventional modeling methods can suffice for this task. Other reliability models (not shown) can be added for other outputs of evaluation device 830, e.g., for special applications.

At the end of the second phase of the decision sub-process, the evaluation device 830 has produced, e.g., evaluations of:
- the expected creditworthiness of the input application 822;
- the creditworthiness of the applicants 502 named in the input application 822;
- the expected profitability of a loan or other extension of credit, made on the terms specified for the input application, to the applicants 502 named in the input application 822; and
- an estimate of the confidence warranted by the estimate of the creditworthiness of the input application 822.

In the third and final phase of the decision sub-process, the policy rules can be applied by rules engine 834 to the outputs of evaluation device 830 to determine the recommended action: accept, reject or counter the input application. The policy rules can be configured to apply management guidelines like acceptable versus unacceptable levels of credit risk, minimum acceptable expected profitability and similar criteria. This function differs little from conventional lending programs except that confidence estimates are often not available in conventional lending processes.

A structured-reference credit process as described herein differs from the use of recommendations, letters of credit and co-makers or co-signers in conventional lending because:

1. references are confidential, even from their subject, thus protecting the veracity and reliability of references by eliminating pressures upon the referencer resulting from giving or not giving a reference;
2. the referencer has no credit liability for the referenced customer's obligations, thus making the giving of references more attractive and making references more numerous (in most applications, some implementations may involve limited, shared liability); and
3. references are an integral part of the credit program, thus fostering the collection of associated records of references, applications, customer performance histories and referencer performance histories and providing a base for applying statistical methods taking full advantage of the increased information for credit performance predictions from the linkage of information about multiple parties through references.

The last point can be critical. Making structured and confidential references an integral part of the lending program enables the application of powerful statistical mathematics to improve credit predictions, especially in environments with limited credit data. Those improved credit predictions, in turn, are the key to making credit more widely available in an efficient marketplace.

The occasional, usually not-confidential, at least not from the subject, references and recommendations used in conventional credit practice do not provide and adequate basis for the needed extensions of statistical credit performance predictions.

Structured-reference credit as described herein is entirely compatible with the use of cosigners, co-makers, co-borrowers and borrowing groups. References can be implemented to include some financial liability for the referencer, or references may co-exist with separate arrangements for shared liability, group borrowing and similar arrangements.

It should be noted that just as the systems and methods described herein compound the value and utility of credit history information, if used improperly, it could also compound the affect of some kinds of fraudulent activity. For example, nearly all widely subscribed financial products are at risk to impersonation of legitimate customers or prospective customers. Most financial institutions continuously evaluate the balance between risk of fraud to an impostor and the inconvenience and cost required to provide more secure systems for customer control of their financial accounts and obligations. In general, a given authority to move funds in a given fraud threat environment calls for a particular level of security.

Lenders that use the systems and methods described herein should take into account that impersonation of a referencer may enable an amplification of the amount a fraud can obtain from posing as that referencer. In particular, an impostor may reference several confederates, or multiple, false personae. Too much of this will become easy to detect, but used in moderation, it could be an effective tool to enlarge the take from impersonations.

To deal with this threat, lenders should evaluate the amount at risk for a possible impersonation with the potential for amplification-by-reference taken into account. In most situations, applications of structured-reference credit lending are to be for smaller loans to first-time or almost first-time borrowers. In such cases, the amplification effect will be small.

Where structured-reference credit is used to support business lending or lending to affluent immigrants with limited credit histories or in markets where extreme privacy laws make it important for larger loans to wealthier individuals, the amplification risk will be proportionately greater and should be given greater weight in the balancing act between security, convenience and cost. Typical countermeasures center on verification of the identity of referencers.

Even without impersonation, some fraud risks may be increased by use of structured-reference credit. These risks involve organized collusion between referencers and applicants. In some environments, it may pay an individual to make a bribe for a reference from another. Likewise, extortion or threat of harm may induce inappropriate references. Alternatively or in combination, some fraud rings may try to build a circle of references over a period of time. For example, a few fraudsters, perhaps with a mix of genuine and fake identities, may make disingenuous references to other fraudsters (or false identities). Loans may then be made and payment performance would start out good. Then could lead to more references, more new loans, still more references, etc., until one day all the loans based on references in this ring cease to pay and never pay again.

Here, as before, the effect is to amplify a conventional application fraud. And, most of the same remedies as for simple impersonation or extortion apply. But, this scheme has another weakness. Assuming the fraud ring has a limited number of identities available; greed is likely to induce the participants to make more and more references to one another. To prevent this, it is prudent for the lender to examine the connectedness of referencers and applicants. If a cluster of customers keeps referring one to another at an unusually high rate, then there is good reason to look more closely for fraud.

All schemes of this kind are ultimately self-limiting because the value of a reference finally depends upon the reliability of the referencer and the performance of others referenced by the same individual. If the lender avoids the temptation to expand credit based on a single referencer too rapidly and is patient enough to see some referenced loans paid down significantly before further betting on the reliability of references from a single source, then the overall risk of fraud will be substantially reduced. As with all matters of credit analysis, there is no substitute for seasoning of time and proven past performance.

Likewise, new referencers with thin credit or banking histories should not be relied upon too heavily, even in confirming groups and especially if a pattern of common references from a small group is found.

The first line of defense against coerced reference threats is to ensure that the existence of references cannot be reliably inferred.

Here are some helpful measures:
- make the medium of creating and transmitting references is as private and secure as possible;
- make it easy to withdraw a reference and provide a short waiting period before a reference is used so that improperly induced references need not persist to be acted upon;
- ensure internal security so that insiders cannot easily detect and report references;
- absolutely avoid a one-to-one correspondence between a reference and a loan or product invitation or an application acceptance;
- carefully review and eliminate possible "tells"—unintended signals that may tip-off the alert fraudsters that a reference has or has not been made look for tells in website behavior, advertising schemes, incentive plans, mail deliveries, etc.;
- add some degree of randomness in the lending response to references;
- add randomness to the delay between receipt of references and any action using those references;
- avoid predictable applicant invitations in response to references vary type, timing and frequency of invitations and their relationship to references;
- vary the rate and extent of structured-reference credit programs from time-to-time making in more or less attractive at different times that are not easy to identify;
- watch for closely timed references and applications (especially when no application invitation is made);
- assign, and provide incentives for, an employee to discover the existence of references without authorization to do so, thereby identifying potential leaks;
- train employees to understand the importance of reference confidentiality;
- find effective ways to cooperate with law enforcement to reduce coercion and bribery—remind law enforcement officials that fraud is usually done by the same organizations involved with much more distasteful crimes.

Overall, the risk to fraud of this kind to structured-reference credit programs as described herein is not much different than the risk of fraud to many other consumer financial products. As usual, vigilance, experience and carefully thinking through consequences are the most useful responses.

The systems and methods described herein can support a wide variety of participants in the key roles of lender, referencer and customer. Some combinations can enhance or expand currently common commercial banking practice. Some can support specific goals as defined by a philanthropist or philanthropists, benevolent or fraternal associations, government agencies, NGOs (Non-Governmental Organizations), development organizations, religious groups, business groups or commercial and banking organizations. Some can meet specific economic development objectives such as improving agricultural credit availability or financing of small businesses in a country, region or city. Some can be intended to achieve specific business goals of a lender such as becoming well-established in a particular community or subpopulation.

In short, a structured-reference credit program as described herein can be used in many variations to achieve many different goals wherever amplification of the implications of limited credit information can be useful.

Such a structured-reference credit program can also be used to improve credit decisions for a wide variety of credit products and services. For example, such a program can be used to improve the delivery of short- or long-term loans, secured or unsecured loans, lines of credit and credit cards, implied credit such as with demand deposits that may not have an explicit advance of funds but do have a vulnerability to abuse. Such a program can also be applied to extensions of non-financial credit such as items in kind, professional services rendered in anticipation of future payment or delivery of a service or good.

Essentially, such a program has application wherever there is benefit to making better decisions about the trustworthiness or creditworthiness of a prospective customer for which limited information or experience is available to the decision maker or process.

A structured-reference credit program as described herein can also be applied with various incentives to prospective referencers or customers. For example, referencers can be promised some reward for successful references of subsequent customers.

Rewards can be tangible such as fees, discounts, gifts or intangible, such as special makers or tokens of respect or establishment. Of course, rewards and incentives should be designed with care to avoid undue inducement that may lead to poor quality references. In general, reference incentives that include some dependency on customer outcome and that emphasize altruistic or reputability tokens have least risk of distortion. Also, care should be taken to engineer incentives that do not clearly reveal the existence or nonexistence of specific references.

Also, prospective and actual applicants and customers can be offered incentives to make application, to perform as agreed (or better) on obligations or to refer or reference other customers. It should be noted that customer referrals other than those described in the reference lending process above can be used in cooperation with the reference lending described herein.

For example, a bank can reward referrals to prospective customers that carry no reference or recommendation quality, only an indication of who may be interested in a lender product or service. Such referrals should be treated differently from references as described for the reference lending described herein.

In many market situations, incentives can be intangible and social. For example, where economic development or enhanced opportunity for a subpopulation is an objective, references can be induced by a sense of responsibility, obligation to others, charitable sensibilities, pride of community, pride in recognition from serving as a referencer and similar social or personal benefits. Intangible incentives should be incorporated in most designs for a reference lending process as described herein.

It should be noted that there does not need to be prohibition on publicly acknowledging referencers. Only acknowledging a particular reference or of the fact that any reference has been made for a particular customer should be prohibited to protect the value of references; however, even these prohibitions may be dropped after passage of a suitable period of time makes any extortion or jealousy unlikely.

Where incentives for references are strong, it can also be appropriate to use references with some limited financial responsibility for the obligations undertaken in reliance on the reference. Full, shared liability for the referencer is not normally advisable, but some proportion of liability for the applicant's responsibility may be appropriate, especially if coupled with strong incentives. Even when some shared liability accrues to referencers, references should remain confidential with respect to the subject applicant.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A structured reference credit decision device, comprising:
    a database configured to store information related to applicants, potential customers, referencers, potential referencers, lenders, and other third parties, wherein each referencer is an entity providing a reference to a lender stating that an applicant would be very likely to repay an extension of credit or use a financial account as agreed;
    a fetch data component executed on a processor coupled with the database, the fetch data component configured to:
    receive input application information,
    fetch relevant information from the database, based on the input application information, related to a subject applicant of the input application information and at least one referencer, and
    generate a plurality of linked data packages based on the fetched information; and
    an evaluation device executed on a processor coupled with the fetch data component, the evaluation device configured to apply credit outcome models to the plurality of linked data packages and generate a recommendation relative to the subject applicant or application.

2. The structured reference credit decision device of claim 1, wherein the database is configured to store lender records for referencers, lender application records, lender account history and activity records, credit history information, and third party reference and application records.

3. The structured reference credit decision device of claim 1, wherein the fetch data component comprises:
    a data access facility configured to receive the input application information, and retrieve the relevant information from the database based on the application information,
    a data organization facility coupled with the data access facility, the data organization facility configured to isolate and organize the data retrieved by the data access facility, and generate the plurality of linked data packages based on the isolated and organized data.

4. The structured reference credit decision device of claim 3, wherein the data access facility is further configured to retrieve information related to some combination of a subject applicant, a prospective referencer, a referencer, a prospective customer, and a customer based on the application information.

5. The structured reference credit decision device of claim 4, wherein the data organization facility is further configured to link historical information for some combination of the subject applicant, the prospective referencer, the referencer, the prospective customer, and the customer based on the application information.

6. The structured reference credit decision device of claim 5, wherein the data organization facility is further configured to link the subject applicant with at least one of credit bureau information, prior application information, and lender's records.

7. The structured reference credit decision device of claim 6, wherein the data organization facility is further configured to link the subject applicant with at least one referencer, and wherein the data organization facility is further configured to link the linked referencer with at least one of credit bureau information, prior application information, and lender's records.

8. The structured reference credit decision device of claim 7, wherein the data organization facility is further configured to link the linked referencer with at least one previously referenced applicant, and wherein the data organization facility is further configured to link the previously referenced applicant with at least one of credit bureau information, prior application information, and lender's records.

9. The structured reference credit decision device of claim 1, wherein the evaluation device is further configured to receive the plurality of data packages as inputs and prune the inputs to eliminate data that is redundant or lacks predictive value.

10. The structured reference credit decision device of claim 1, wherein the evaluation device comprises at least one of neural network models, a multivariate predictive mathematical model, constrained optimization models, regression models, CART models, and rules sets or other types of statistical models.

11. The structured reference credit decision device of claim 1, further comprising a plurality of evaluation devices, wherein some or all of the plurality of evaluation devices are configured to accept some of the plurality of data packages and generate outputs that are fed to others of the plurality of evaluation devices.

12. The structured reference credit decision device of claim 1, further comprising a confidence estimator coupled with the evaluation device, the confidence estimator configured to estimate the accuracy and reliability of the output of the evaluation device.

13. The structured reference credit decision device of claim 1, further comprising a rules engine coupled with the evaluation device, the rules engine configured to apply policy rules to the output of the evaluation device that govern the recommendation related to the subject applicant or application.

14. The structured reference credit decision device of claim 1, wherein the reference credit decision device is interfaced with one or more external third party databases, and wherein the fetch data component is further configured to fetch relevant information from the external third party database, based on the application information, related to a subject applicant of the input application information or at least one referencer, and generate the plurality of linked data packages based on the fetched information.

15. The method of claim 14, wherein applying credit outcome models to the plurality of linked data packages further comprises generating an output based thereon, and wherein the method further comprises applying policy rules to the output that govern the recommendation related to the subject applicant.

16. A method for structured reference credit decisions, comprising:
    storing, in a database, information related to applicants, potential customers, referencers, potential referencers, lenders, and other third parties, wherein each referencer is an entity providing a reference to a lender stating that an applicant would be very likely to repay an extension of credit or use a financial account as agreed;
    receiving input application information;
    fetching, by a computer system, relevant information from the database, based on the application information, related to a subject applicant of the input application information and at least one referencer;

generating, by the computer system, a plurality of linked data packages based on the fetched information;

applying, by the computer system, credit outcome models to the plurality of linked data packages; and generating, by the computer system, a recommendation relative to the subject applicant or application.

17. The method of claim 16, wherein storing information related to applicants further comprises storing lender records for referencers, lender application records, lender account history and activity records, credit history information, and third party reference and application records.

18. The method of claim 16, wherein fetching relevant information from the database further comprises isolating and organizing the fetched information, and wherein generating a plurality of linked data packages further comprises generating the plurality of linked data packages based on the isolated and organized data.

19. The method of claim 18, wherein fetching relevant information further comprises fetching information related to some combination of a subject applicant, a prospective referencer, a referencer, a prospective customer, and a customer based on the application information.

20. The method of claim 19, wherein generating a plurality of linked data packages further comprises linking historical information for some combination of the subject applicant, the prospective referencer, the referencer, the prospective customer, and the customer based on the application information.

21. The method of claim 20, wherein generating a plurality of linked data packages further comprises linking the subject applicant with at least one of credit bureau information, prior application information, and lender's records.

22. The method of claim 21, wherein generating a plurality of linked data packages further comprises linking the subject applicant with at least one referencer and linking the linked referencer with at least one of credit bureau information, prior application information, and lender's records.

23. The method of claim 22, wherein generating a plurality of linked data packages further comprises linking the linked referencer with at least one previously referenced applicant and linking the previously referenced applicant with at least one of credit bureau information, prior application information, and lender's records.

24. The method of claim 16, wherein applying credit outcome models to the plurality of linked data packages further comprises pruning the information in the plurality of linked data packages to eliminate data that is redundant or lacks predictive value.

25. The method of claim 16, further comprising estimating the accuracy and reliability of the output of the evaluation device.

* * * * *